Aug. 3, 1948. H. R. FORNEY 2,446,223
EXTENSIBLE AND RETRACTABLE DRAFT HITCH
Filed July 13, 1945
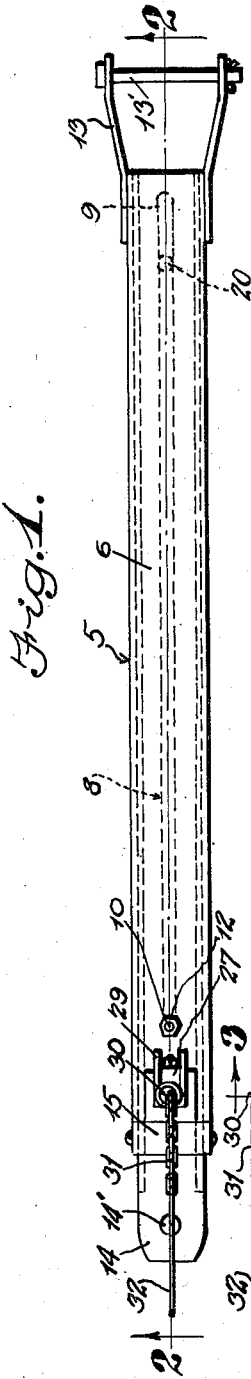
INVENTOR
Harold R. Forney
ATTORNEYS Patented Aug. 3, 1948

2,446,223

UNITED STATES PATENT OFFICE 2,446,223

EXTENSIBLE AND RETRACTABLE DRAFT HITCH

Harold R. Forney, Surprise, Nebr.

Application July 13, 1945, Serial No. 604,760

1 Claim. (Cl. 280—33.14)

This invention relates to draft hitches and more particularly to such devices for coupling trailers to tractors and the like.

An object of the invention is to produce a simple yet practical draft hitch of an extensible and retractible type which is not only of simple construction and embodying a minimum number of parts but one possessing strength and durability and is adjusted and applied with ease and facility in the coupling of a trailer to a tractor or the like with the trailer positioned at different distances apart from the tractor just prior to the coupling of the trailer to the tractor.

Other objects and advantages to be attained will hereinafter appear in the following description.

A non-limiting yet practical adaptation and exemplification of the invention is illustrated in the accompanying drawings, in which:

Figure 1 is a plan view of the hitch with the extensible element thereof in its retracted position;

Figure 2 is a longitudinal section on the line 2—2 of Figure 1;

Figure 3 is a cross section, on an enlarged scale, taken on or about the line 3—3 of Figure 2; and Figure 4 is a cross sectional view taken on or about the line 4—4 of Figure 2.

Referring now to the drawings in detail, the numeral 5 designates, generally, the hitch device in its entirety. As shown, the device comprises an outer elongated tubular member 6 in which is fitted an inner elongated tubular member 7. Said inner tubular member 7 is slidable longitudinally in said outer tubular member 6, said members 6 and 7 being of any desirable cross sectional form. As shown, they are of rectangular cross section (see Figures 3 and 4) and, for practical purposes, they are preferably of this form but the same may be obviously made in any other angular cross sectional form or of a round form.

The inner tubular member 7 is provided in one side wall portion with an elongated longitudinal slot 8 which terminates at one end in proximity to the inner end of said inner tubular member 7, as at 9, the opposite end of said slot 8 terminating, as at 9', adjacent to the outer end of said inner tube 7 but at a distance more remote from the adjacent end of the tube than said opposite end portion 9 of the slot terminates with relation to the inner end of the tube.

Suitable means is provided on said outer tube 6 to cooperate with said slotted portion 8 of said inner tube 7 so as to limit the outermost position of said inner tube 7 when the tube is in its outermost extended position with relation to said outer tubular member 6. This means on said outer tubular member 6 for cooperation with the slotted portion 8 of said inner tubular member 7, in addition to limiting the outermost position of said inner tubular member 7, also serves to prevent independent rotation of the one tubular member with relation to the other in the event said tubular members are made of a circular cross section. As shown, the cooperating stop element on said outer tubular member 6 comprises a bolt 10 having a head 11 at one end which fits tightly yet freely slidable in said longitudinal groove 8 of the inner tubular member 7, said head 11 of the bolt 10 being drawn tight against the adjacent inner face portion of the wall of the outer tubular member 6 by a nut 12 which is screwed onto the threaded outer end portion of said bolt 10 and turned tight against said outer face portion of the tubular member 6. In this way, said stop element in the form of a bolt as just described, is readily applied to and removed from the wall of the outer tubular member 6 when desired or necessary.

It is here noted that for the use of the device in coupling a trailer to a tractor or the like, the outer tubular member 6 is provided at its outer end with a clevis or end connector element 13 of any conventional or approved form and provided with a detachable bolt 13'. The outer end portion of said inner tubular member 7, which is opposite to the outer end of said tubular member 6, is also provided with an end attaching element. As shown, this particular attaching element, designated by the numeral 14, is produced by cutting away opposite side wall portions of the protruding end portion of said inner tubular member 7, leaving two opposed plate portions which are provided with aligned apertures for the reception of a detachable bolt 14'.

A collar 15 is sleeved on the outer end portion of said inner tubular member 7 and fastened thereto in any approved manner, such as by a welding to or shrinking the collar on said tubular member 7 or obviously by riveting or fastening the same in place by a screw element or otherwise. This particular feature of the structure being conventional and obvious the same is not illustrated in detail in the drawings.

The provision of said collar 15 on the end portion of said inner tubular member 7 is to afford a thrust shoulder to abut against the adjacent inner end portion of said outer tubular member 6 when said inner tubular member 7 is moved to its fully closed position telescopically within said outer tubular member.

Directly and transversely opposite the outer end portion of the longitudinal slot 8 of said inner tubular member 7 is a circular opening 16 to receive the end portion 17 of a latch bolt 18 which is fitted slidably in a corresponding opening 19 provided in the adjacent wall portion of said outer tubular member 6. In this connection, it is here noted that the opening 19 receives the end portion 17 of said latch bolt 18 with a comparatively tight sliding fit, but the opening 16 in the wall portion of said inner tubular member 7 is of a somewhat larger diameter and said opening 16 is correlated to the inner end of said collar 15 so that, when said collar 15 is in contact with the adjacent end of said outer tubular member 6, said opening 16 which is slightly enlarged as compared to the opening 19 in the outer tubular member 7 is positioned so that the bolt 18 readily enters said opening 16. In this connection, it is also noted that said latch bolt 18 is supported and slides longitudinally in an aperture corresponding in size to the aperture 19 and located in alignment with said opening 19 in the opposite wall portion of said tubular member 6. It is also further noted that the end portion 9' of said slot 8 of the inner tubular member 7 is correlated and aligned with the opening 16 of said inner tubular member so that, when said tubular member 7 is in its innermost position with the collar 15 thereof abutting the adjacent end of said outer tubular member 6, there is ample clearance between said end portion 9' of the slot 8 and the adjacent portion of the latch bolt 18 so as to avoid any binding upon said latch bolt 18. Adjacent the inner end of said inner tubular member 7 there is provided an aperture 20, corresponding in size to the aperture 16 at the outer end portion of said tubular member 7, which latter aperture 20 is brought into a position to register with the opening 19 in the outer tubular member 6 when said inner tubular member 7 is brought to its outermost extended position and the inner end portion 9 of its slot 8 is brought against said stop bolt 10.

By the provision of these apertures 16 and 20 in said inner tubular member 7, said tubular member, when in its innermost retracted position as shown in Figure 2, said latch bolt 18 is projected through the aligned openings 16 and 19 and said inner tubular member is thus held against outward movement in said outer tubular member. By the same token, when said inner tubular member 7 is withdrawn in the outer tubular member to its fully extended position, said aperture 20 is brought into registration with said aperture 19 and the end portion 17 of said latch bolt 18 is projected therethrough, thus effectively holding said inner tubular member 7 from further outward or an inward movement in said outer tubular member 6.

While the latch bolt 18 may be manipulated in any desirable manner for its placement in and removal from holding relation in the respective apertures 16, 19 and 20, as just hereinabove described, special provision for the release of said latch bolt 18 by an operator at a place on the tractor and some distance remote from the latch bolt 18, is illustrated in the drawings. As shown, said latch bolt 18 is extended some distance outward beyond the adjacent side of said outer tubular member 6 where it is provided at its end with a loop or eye 21. The portion of the latch bolt 18 between its end having the loop or eye 21 and a transverse pin 21' projected diametrically on opposite sides of said bolt 18, is located and works within an inverted substantially U-shaped bracket 23 the ends of whose leg portions 24 are welded or otherwise securely fastened as at 25, to the adjacent face portion of the wall of said outer tubular member 6. A spring element 26 is coiled about said latch bolt 18 between said transverse pin 21 and the top portion 23 of said inverted U-shaped bracket element. This spring 26 is constantly under tension and reacts to force said latch bolt 18 with its end portion 17 in the registering openings 16 and 19 or the openings 20 and 19, as the case may be.

As above stated, this latch bolt 18 as thus mounted and spring urged, may be retracted in any manner and manually at that. However, to cause the release of the latch bolt from its holding engagement in the aforesaid apertures in the tubular body members 6 and 7, by an operator at a position somewhat remote from the latch bolt, an upstanding bracket 27 is bolted, as at 28 (see Figure 2), or in any other suitable manner to said inverted U-shaped bracket 23 or, obviously, directly to said outer tubular member and independently of said bracket member 23, as may be more convenient or desirable. Said upstanding bracket 27 is provided with a lateral arm 29 in which is provided or formed an eye or grommet 30. As shown, this eye or grommet 30 is slightly elongated with respect to the axis of its opening, which opening is flared at its opposite ends and restricted intermediate its ends with a smooth and rounded surface throughout, and said opening being in axial alignment with the adjacent end portion of said latch bolt 18. A short section of chain or a relatively strong and durable flexible element 30 which will withstand wear caused by movement of said element through said grommet 30 is attached at one end to the loop or eye 21 of said latch bolt 18 and at its opposite end to a cord, rope or flexible wire element 32, which flexible element is of a length to be extended to within reach of the operator on the tractor. By this provision, the latch bolt 18 may be released from its locking position with respect to the outer and inner tubular members 6 and 7 at a distance remote therefrom, if desired, or, an operator may manipulate said latch bolt 18 from a position in close proximity to the same.

In the use of the hitch device of the present invention, the latch bolt 18 is released from its holding relation to said tubular members 6 and 7, at which time the trailer to be hitched to the tractor may be located at a considerable distance from the tractor, of course, within the length of the fully extended hitch device, and after the clevises or end attaching elements 13 and 14 are connected respectively to the trailer and the tractor, if the latch bolt 18 should be in its locking position with relation to the rear aperture 20 of the inner tubular member and the registered aperture 19 of the outer tubular member, the latch bolt is accordingly released, which release may be effected by the operator on the tractor through the medium of the pull cord 32, whereupon the operator causes the tractor to move backward and thus telescopes the inner tubular member 7 into the outer tubular member 6 and upon said inner tubular member 7 reaching its innermost position in the outer tubular member 6 the latch bolt 18 is automatically snapped, under the pressure of the spring element 26 into its locking engagement in the apertures 16 and 19. Obviously, if the inner tubular member 7 is not in its fully extended position at the time the hitch connection is being made between the tractor and the trailer, said latch bolt 18, of course, is not engaged in either of the openings 16 or 20 as said openings are not in registering alignment with said latch bolt but said bolt is pressed with its end portion 17 in frictional contact with the inner face of the opposed wall of said inner tubular member 7 under the influence of the spring element 26. However, in whatever position the inner tubular member 7 may be in its extension from said outer tubular member 6, the movement of the inner tubular member to its innermost retracted position may be effected by backward movement of the tractor as just above described.

The construction and arrangement illustrated in the accompanying drawings is but one practical exemplification of the invention. Therefore, the same may be modified in many respects within the spirit and scope of the appended claim, and the invention is not limited to the construction and arrangement shown.

Having thus described the invention, what is claimed is:

A device for coupling a trailer to a motor vehicle comprising an outer member, an inner member slidably mounted within said outer member, means at the outer ends of said members for detachably connecting one to a vehicle and the other to a trailer, said inner member having a slot through one side thereof, said slot extending longitudinally of said inner member and terminating short of the ends thereof, and a latch bolt mounted adjacent the inner end of said outer member on the side thereof overlying said slot in said inner member, said outer member having an opening to receive said bolt, said opening being in registry with said slot, said latch bolt extending through said opening and said slot into said inner member, said inner member having spaced openings, one adjacent each end thereof on the side of said member transversely opposite said slot to receive said latch bolt in the retracted and expanded position of said coupling, and said outer member having an opening positioned to register with said spaced openings at said positions.

HAROLD R. FORNEY.

REFERENCES CITED

The following references are of record in the file of this patent:

UNITED STATES PATENTS

| Number | Name | Date |
| --- | --- | --- |
| 1,296,105 | Narratil | Mar. 4, 1919 |
| 2,292,751 | Forney | Aug. 11, 1942 |